(12) United States Patent
Grard et al.

(10) Patent No.: US 12,358,533 B2
(45) Date of Patent: Jul. 15, 2025

(54) SYSTEM FOR ASSISTING WITH DRIVING A VEHICLE

(71) Applicant: VALEO VISION, Bobigny (FR)

(72) Inventors: Christophe Grard, Bobigny (FR); Gregory Planche, Bobigny (FR); Youssef Ghaly, Bobigny (FR); Mickael Mimoun, Bobigny (FR)

(73) Assignee: Valeo Vision, Bobigny (FR)

( * ) Notice: Subject to any disclaimer, the term of this patent is extended or adjusted under 35 U.S.C. 154(b) by 118 days.

(21) Appl. No.: 18/245,851

(22) PCT Filed: Jul. 28, 2021

(86) PCT No.: PCT/EP2021/071227
§ 371 (c)(1),
(2) Date: Mar. 17, 2023

(87) PCT Pub. No.: WO2022/063464
PCT Pub. Date: Mar. 31, 2022

(65) Prior Publication Data
US 2024/0034358 A1 Feb. 1, 2024

(30) Foreign Application Priority Data

Sep. 22, 2020 (FR) ...................................... 2009571

(51) Int. Cl.
*B60W 60/00* (2020.01)
*B60Q 1/08* (2006.01)
(Continued)

(52) U.S. Cl.
CPC ......... *B60W 60/0016* (2020.02); *B60Q 1/085* (2013.01); *B60W 10/20* (2013.01);
(Continued)

(58) Field of Classification Search
CPC .. B60W 60/0016; B60W 10/20; B60W 10/30; B60W 50/14; B60W 2552/00;
(Continued)

(56) References Cited

U.S. PATENT DOCUMENTS 6,926,374 B2 8/2005 Dudeck et al.
9,145,139 B2 9/2015 Ferguson et al.
(Continued)

FOREIGN PATENT DOCUMENTS

CN 104842995 A 8/2015
CN 104973125 A 10/2015
(Continued)

OTHER PUBLICATIONS

European Patent Office, International Search Report (including English translation) and Written Opinion of corresponding International Application No. PCT/EP2021/071227, dated Nov. 3, 2021.
(Continued)

*Primary Examiner* — Hunter B Lonsberry
*Assistant Examiner* — Helen Li
(74) *Attorney, Agent, or Firm* — Valeo Vision

(57) ABSTRACT

The invention relates to a system for assisting with driving a vehicle, including at least one sensor configured to detect the presence of an object in an environment outside the vehicle, at least one camera configured to acquire images of the environment outside the vehicle and to detect the presence of the object in the environment outside the vehicle. The at least one sensor detects at least one free space in the environment outside the vehicle, the at least one camera, on the basis of the acquired images, detects at least one free space. An electronic control unit configured to select a free space found by the at least one sensor and/or the at least one camera, the electronic control unit activates the display of
(Continued)

images in the selected free space so as to indicate a new path to be followed by the vehicle.

16 Claims, 9 Drawing Sheets

(51) Int. Cl.
  *B60W 10/20* (2006.01)
  *B60W 10/30* (2006.01)
  *B60W 50/14* (2020.01)

(52) U.S. Cl.
  CPC ............ *B60W 10/30* (2013.01); *B60W 50/14* (2013.01); *B60Q 2300/40* (2013.01); *B60Q 2800/10* (2022.05); *B60W 2050/146* (2013.01); *B60W 2420/403* (2013.01); *B60W 2552/00* (2020.02); *B60W 2554/00* (2020.02)

(58) Field of Classification Search
  CPC ....... B60W 2554/00; B60W 2050/146; B60W 2420/403; B60Q 1/085; B60Q 2800/10; B60Q 2300/40
  USPC .......................................................... 701/23
  See application file for complete search history.

(56) References Cited

U.S. PATENT DOCUMENTS

| | | | |
|---|---|---|---|
| 9,272,710 B2 | 3/2016 | Jeon et al. | |
| 11,167,796 B2 | 11/2021 | Modig et al. | |
| 11,505,183 B2 | 11/2022 | Kim | |
| 2017/0088053 A1* | 3/2017 | Orellana | B60R 1/12 |
| 2017/0106750 A1* | 4/2017 | Tauchi | G06F 3/147 |
| 2019/0031197 A1* | 1/2019 | You | B60R 1/24 |
| 2019/0071075 A1* | 3/2019 | Mimura | G06V 20/58 |
| 2019/0143968 A1 | 5/2019 | Song et al. | |
| 2020/0218979 A1* | 7/2020 | Kwon | G06F 18/2155 |
| 2021/0394752 A1* | 12/2021 | Satoh | B60W 30/09 |

FOREIGN PATENT DOCUMENTS

| | | | | |
|---|---|---|---|---|
| CN | 105358399 A | 2/2016 | | |
| CN | 105976641 A | 9/2016 | | |
| CN | 110745134 A | 2/2020 | | |
| CN | 111516678 A | 8/2020 | | |
| EP | 2415636 A2 * | 2/2012 | ............ | B60Q 1/085 |
| EP | 3536575 A2 | 9/2019 | | |
| JP | 2006185410 A | 7/2006 | | |
| WO | WO-2016198572 A1 * | 12/2016 | ............ | B60K 37/06 |
| WO | 2020099555 A1 | 5/2020 | | |

OTHER PUBLICATIONS

China Patent Office, First Office Action (with English translation) and Search Report of corresponding Chinese Application No. 202180064284.9, dated Apr. 4, 2025, 27 pages.

\* cited by examiner

SYSTEM FOR ASSISTING WITH DRIVING A VEHICLE

TECHNICAL FIELD

The present invention relates to a system for assisting with driving a vehicle. It also relates to a method for assisting with driving a vehicle at night and to a method for assisting with driving a vehicle during the day. It is particularly but non-limitingly applicable to motor vehicles.

BACKGROUND OF THE INVENTION

In the field of systems for assisting with driving a vehicle, one such system for assisting with driving a vehicle comprises, in a manner known to those skilled in the art:
- a sensor configured to detect the presence of an object in an environment outside the vehicle,
- a camera configured to acquire images of the outside environment and also detect the presence of the object,
- at least one light-emitting device configured to illuminate the road on which said motor vehicle is driving.

When an object is detected by the sensor and by the camera, if it is on the path of the moving motor vehicle, and depending on its distance, a warning system is activated if the detected object is far enough from the motor vehicle, and an emergency braking system is activated to avoid an accident if the detected object is close to the motor vehicle.

One drawback of this prior art is that, if the motor vehicle is driving too fast, there is a high risk that an accident will not be able to be avoided, even in the event of activation of the emergency braking system.

SUMMARY OF THE INVENTION

In this context, the present invention aims to provide a system for assisting with driving a vehicle that allows the abovementioned drawback to be solved.

To this end, the invention proposes a system for assisting with driving a vehicle, said system for assisting with driving a vehicle comprising:
- at least one sensor configured to detect the presence of an object in an environment outside the vehicle,
- at least one camera configured to acquire images of the environment outside the vehicle and to detect the presence of said object in the environment outside the vehicle, characterized in that:
- said at least one sensor is further configured to detect at least one free space in the environment outside said vehicle,
- said at least one camera is further configured, on the basis of said acquired images, to detect at least one free space, and in that:
- said driving-assisting system further comprises an electronic control unit configured to select a free space found by said at least one sensor and/or said at least one camera,
- said electronic control unit is further configured to activate display of images in the selected free space so as to indicate a new path to be followed for said vehicle.

According to non-limiting embodiments, said system for assisting with driving a vehicle may further comprise one or more of the following additional features, implemented alone or in any technically possible combination.

According to one non-limiting embodiment, said driving-assisting system further comprises:
- at least one light-emitting device configured to illuminate said detected object,
- at least one light-emitting device configured to illuminate said at least one selected free space.

According to one non-limiting embodiment, said at least one light-emitting device is further configured to illuminate the scene in which said detected object is located.

According to one non-limiting embodiment, said at least one light-emitting device is a headlamp.

According to one non-limiting embodiment, said electronic control unit is configured to select a free space found by said sensor and by said camera.

According to one non-limiting embodiment, said images are luminous images projected onto a road comprising said selected free space.

According to one non-limiting embodiment, said images are images displayed on a human-machine interface.

According to one non-limiting embodiment, said vehicle is an autonomous vehicle.

According to one non-limiting embodiment, said driving-assisting system further comprises an AES device for steering the vehicle in an emergency, said device being configured to move said vehicle toward said selected free space, AES being the acronym of autonomous emergency steering.

According to one non-limiting embodiment, said vehicle is a semi-autonomous vehicle.

According to one non-limiting embodiment, said driving-assisting system further comprises an AES device for steering the vehicle in an emergency, said device being configured to take charge of a movement of the vehicle in the direction of said selected free space, said movement being initiated by an action of a driver on the steering wheel of said vehicle, AES being the acronym of autonomous emergency steering.

According to one non-limiting embodiment, said vehicle is a non-autonomous vehicle.

According to one non-limiting embodiment, said electronic control unit is further configured to transmit a signal to a human-machine interface of said vehicle and/or to modify the color of a light beam of at least one light-emitting module placed in the passenger compartment of said vehicle.

According to one non-limiting embodiment, said electronic control unit is further configured to compute a time to collision with said detected object.

According to one non-limiting embodiment, said at least one sensor and said at least one camera are configured to detect at least one free space in the environment outside said vehicle if said time to collision is less than a threshold, and said electronic control unit is configured to activate display of images in the selected free space so as to indicate a new path to be followed for said vehicle if said time to collision is less than said threshold.

According to one non-limiting embodiment, said luminous images represent an arrow corresponding to said new path of the vehicle.

According to one non-limiting embodiment, said at least one light-emitting device configured to illuminate said at least one selected free space is the light-emitting device configured to illuminate said detected object.

A method for assisting with driving a vehicle at night is also provided, said method for assisting with driving at night comprising:
- detection, by at least one sensor, of the presence of an object in an environment outside the vehicle, illumination, by at least one light-emitting device, of said detected object, acquisition, by at least one camera, of images of the environment outside the vehicle, detection, by said at least one camera, of the presence of said object in the environment outside the vehicle, characterized in that said method for assisting with driving at night further comprises:

detection, by said at least one sensor, of at least one free space around said vehicle, on the basis of said acquired images, detection, by said at least one camera, of at least one free space, illumination, by at least one light-emitting device, of said at least one free space found, selection, by an electronic control unit, of said at least one free space found by said at least one sensor and/or by said at least one camera, activation, by said electronic control unit, of display of images in the selected free space so as to indicate a new path for said vehicle.

According to non-limiting embodiments, said method for assisting with driving at night may further comprise one or more of the following additional features, implemented alone or in any technically possible combination.

According to one non-limiting embodiment, said method for assisting with driving at night further comprises illumination, by said at least one light-emitting device, of the scene in which said detected object is located.

According to one non-limiting embodiment, said method for assisting with driving at night further comprises computation, by said electronic control unit, of a time to collision with said detected object.

According to one non-limiting embodiment, said steps of detection of at least one free space, of illumination of said at least one free space, of selection of aid at least one free space and of activation of display of images are executed if said time to collision is less than or equal to a threshold.

According to one non-limiting embodiment, said images are luminous images projected onto a road.

According to one non-limiting embodiment, said images are images displayed on a human-machine interface.

A method for assisting with driving a vehicle during the day is also provided, said method for assisting with driving during the day comprising:

detection, by at least one sensor, of the presence of an object in an environment outside the vehicle, acquisition, by at least one camera, of images of the environment outside the vehicle, detection, by said at least one camera, of the presence of said object in the environment outside the vehicle, characterized in that said method for assisting with driving during the day further comprises:

detection, by said at least one sensor, of at least one free space around said vehicle, on the basis of said acquired images, detection, by said at least one camera, of at least one free space, selection, by an electronic control unit, of said at least one free space found by said at least one sensor and/or by said at least one camera, activation, by said electronic control unit, of display of images in the selected free space so as to indicate a new path for said vehicle.

According to non-limiting embodiments, said method for assisting with driving during the day may further comprise one or more of the following additional features, implemented alone or in any technically possible combination.

According to one non-limiting embodiment, said method for assisting with driving during the day further comprises computation, by said electronic control unit, of a time to collision with said detected object.

According to one non-limiting embodiment, said steps of detection of at least one free space, of selection of said at least one free space and of activation of display of images are executed if said time to collision is less than or equal to a threshold.

According to one non-limiting embodiment, said images are luminous images projected onto a road.

According to one non-limiting embodiment, they are images displayed on a human-machine interface.

According to one non-limiting embodiment, the method for assisting with driving during the day further comprises illumination, by at least one light-emitting device, of said detected object.

According to one non-limiting embodiment, the method for assisting with driving during the day further comprises illumination, by at least one light-emitting device, of said at least one free space found.

BRIEF DESCRIPTION OF DRAWINGS

The invention and its various applications will be better understood on reading the description that follows and on studying the figures which accompany it.

DETAILED DESCRIPTION OF THE INVENTION

Figure 1A:
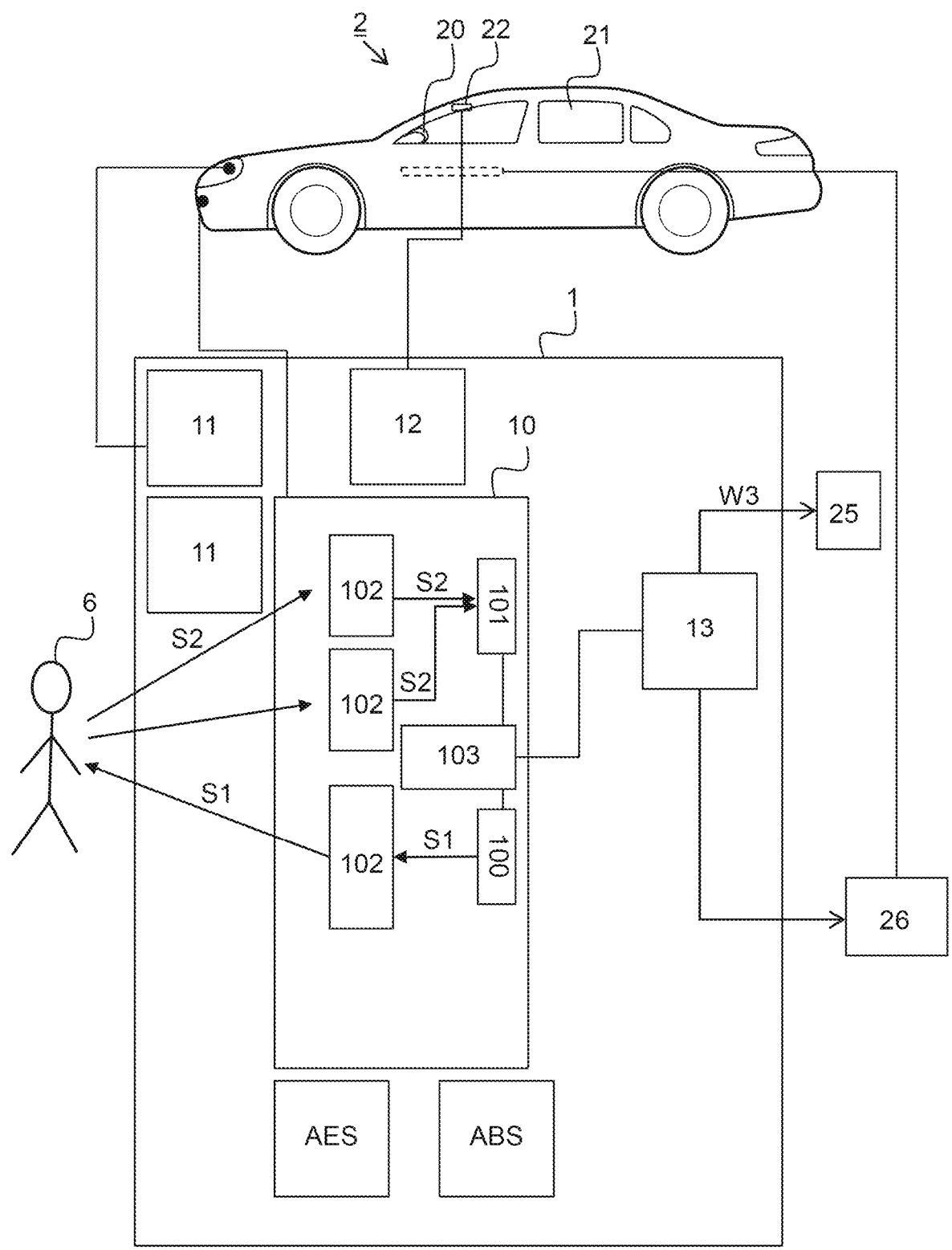
FIG. 1a is a schematic view of a system for assisting with driving a vehicle, the driving-assisting system comprising at least one sensor, at least one camera, at least one light-emitting device and an electronic control unit, according to one non-limiting embodiment of the invention.

Unless otherwise indicated, elements that are identical in structure or function and that appear in more than one figure have been designated by the same references in all the figures in which they appear.

The system 1 for assisting with driving a vehicle 2 according to the invention is described with reference to FIGS. 1a to 5 and 8. In one non-limiting embodiment, the vehicle 2 is a motor vehicle. By motor vehicle, what is meant is any type of motorized vehicle. This embodiment is considered, by way of non-limiting example, in the remainder of the description. In the remainder of the description, the vehicle 2 is thus also referred to as the motor vehicle 2. The motor vehicle 2 comprises a steering wheel 20 and a passenger compartment 21. It further comprises two headlamps 11. In non-limiting embodiments, the motor vehicle 2 is an autonomous, semi-autonomous or non-autonomous vehicle. In the case of an autonomous or semi-autonomous vehicle 2, in one non-limiting embodiment, the driving-assisting system 1 comprises an AES device for steering the vehicle 2, which device has been referenced AES in FIGS. 1a and 1b, AES being the acronym of autonomous emergency steering. In one non-limiting embodiment, the driving-assisting system 1 also comprises an AEB device, which device has been referenced AEB in FIGS. 1a and 1b, AEB being the acronym of autonomous emergency braking. The device AEB is configured to brake the motor vehicle 2 in an emergency (function f13(AEB, 2) illustrated in FIG. 1b) in the case of an autonomous or semi-autonomous motor vehicle 2. In one non-limiting embodiment, the driving-assisting system 1 is activated when the motor vehicle 2 is started.

Figure 1B:
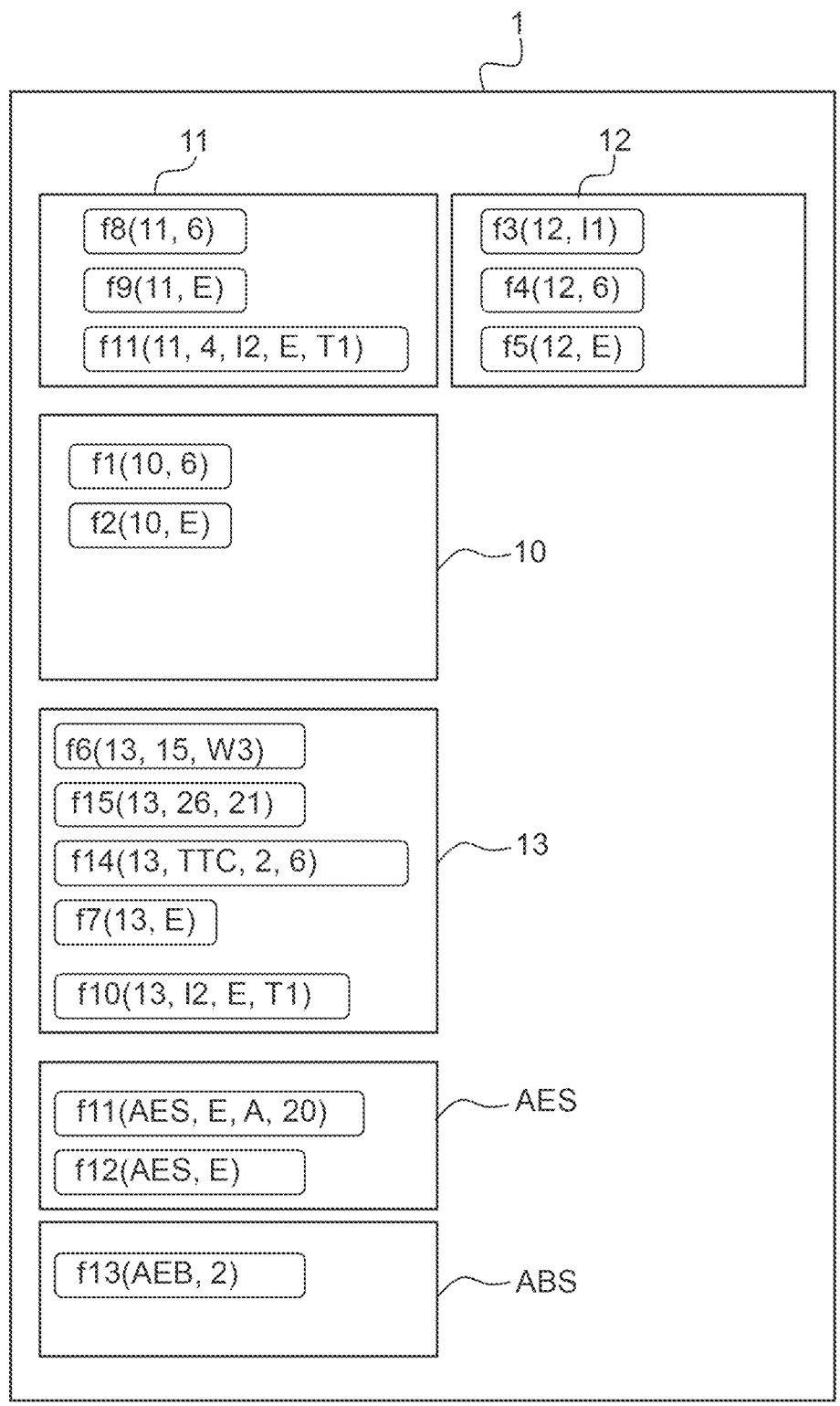
FIG. 1b illustrates the functions of said sensor, of said camera, of said at least one light-emitting device and of said electronic control unit of the system for assisting with driving a vehicle of FIG. 1a, according to one non-limiting embodiment.

As illustrated in FIGS. 1a and 1b, the driving-assisting system 1 comprises:
  at least one sensor 10,
  at least one camera 12,
  an electronic control unit 13.

In one non-limiting embodiment, the driving-assisting system 1 further comprises at least one light-emitting device 11.

The components of the driving-assisting system 1 are described below.

Said at least one sensor 10 is described in detail below. Said at least one sensor 10 is configured to detect the presence of at least one object 6 in an environment outside the vehicle 2 (function f1(10, 6) illustrated in FIG. 1b). It is thus configured to scan the environment outside the motor vehicle 2, by virtue of transmission of radar waves. In one non-limiting embodiment, the sensor is a radar sensor. In another non-limiting embodiment, the sensor is a lidar. In one non-limiting embodiment, the sensor 10 is a sensor employing millimeter waves (waves between 24 GHz and 300 GHz) or sub-microwaves (waves between 300 MHz and 79 GHz) or microwaves (waves between 1 GHz and 300 GHz). In non-limiting embodiments, the sensor 10 is placed behind the windshield of the motor vehicle 2, or in a light-emitting device 11 of the motor vehicle 2. Thus, it will detect any (moving or stationary) object or objects 6 located in front of and to the sides of the motor vehicle 2, i.e. in its field of view, on the current path T0 (illustrated in FIGS. 2a and 2b) of the motor vehicle 2. These objects 6 are problematic, because they are on the current path T0 of the motor vehicle 2 or are due to cross said current path T0. They are thus obstacles that must be avoided. It will be noted that whether an object 6 is due to cross said current path T0 or not may be determined by computing its speed and its orientation. The sensor 10 provides this information. Since this computation is well known to those skilled in the art, it is not described here. It will be noted that when it detects an object 6, the sensor 10 classifies it. It will thus identify it as being a pedestrian, a vehicle, a tree, etc. In the non-limiting example illustrated in FIGS. 2a and 2b, the sensor 10 has detected a pedestrian 6a in its field of view. It will be noted that the sensor 10 detects all the objects in its field of view. Thus, it may detect the tree 6c and the markings 6b at the same time as the pedestrian 6a if they are visible in its field of view.

As illustrated in FIG. 1a, the sensor 10 comprises a transmitter 100 configured to generate a plurality of radar waves S1, a receiver 101 configured to process a plurality of radar waves S2, and a plurality of antennas 102. In one non-limiting embodiment, a single electronic component may be used for both the transmission function and the reception function. There will thus be one or more transceivers. Said transmitter 100 generates radar waves S1 that are subsequently transmitted by an antenna 102, and that, when they encounter an object 6 in the environment outside the vehicle 2, are reflected by said object 6. The radar waves thus reflected get transmitted back to the sensor 10. These radar waves S2 are received by the antennas 102 and processed by the receiver 101. They are radar waves transmitted back in the direction of the sensor 10. In one non-limiting embodiment, the transmitted radar waves S1 or the received radar waves S2 are radio-frequency signals (in the case of the radar sensor). In another non-limiting embodiment, the transmitted radar waves S1 or the received radar waves S2 are infrared signals (in the case of the lidar). In one non-limiting embodiment, the sensor 10 comprises a plurality of transmitters 100 and a plurality of receivers 101. In one non-limiting embodiment, the sensor 10 comprises at least one so-called transmit antenna 102, and at least two so-called receive antennas 102. Thus, one or more so-called transmit antennas 102 are configured to transmit the radar waves S1 generated by the transmitter 100. Thus, two or more other so-called receive antennas 102 are configured to receive the radar waves S2 and to communicate them to the receiver 101, which subsequently processes them. The phase difference between the radar waves S2 received by the receive antennas allows the direction of said radar waves S2 and the position of said object 6 to be determined.

As illustrated in FIG. 1a, the sensor 10 further comprises an electronic control unit 103 configured to control the transmitter 100 and the receiver 101 and to communicate with the electronic control unit 13 of the driving-assisting system 1. In particular, the electronic control unit 103 will transmit the radar waves S2 processed by the receiver 101 to the electronic control unit 13.

The sensor 10 is further configured to detect at least one free space E around the motor vehicle 2(function f2(10, E) illustrated in FIG. 1b). In order to detect a free space E, it looks for the absence of objects 6 in a given space in the environment outside the vehicle. In other words, it detects whether there are no reflected radar waves S2 or whether the radar waves S2 reflected indicate that the one or more detected objects 6 are far off.

Figure 3A:
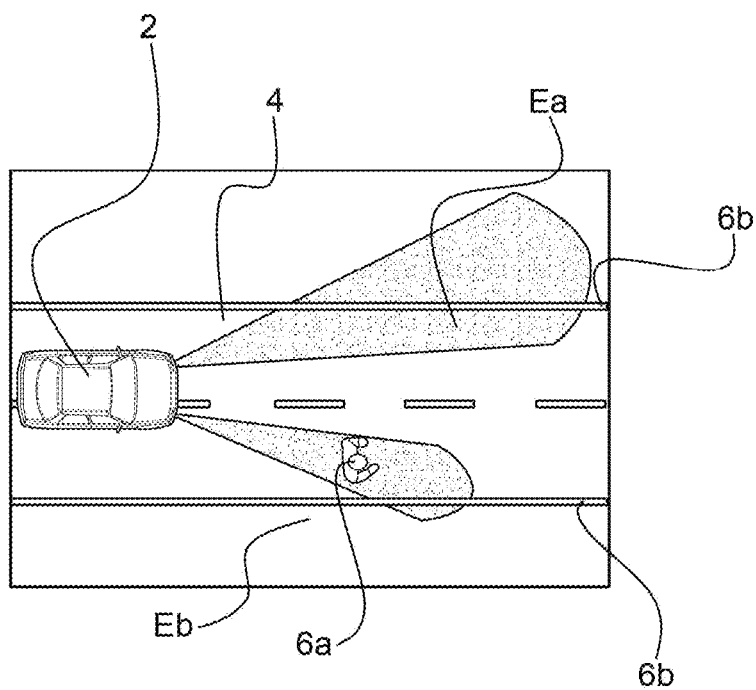
FIG. 3a is a schematic view from above of the vehicle of FIG. 1a and of a free space detected and illuminated by the driving-assisting system of FIGS. 1a and 1b, according to one non-limiting embodiment.
Figure 3B:
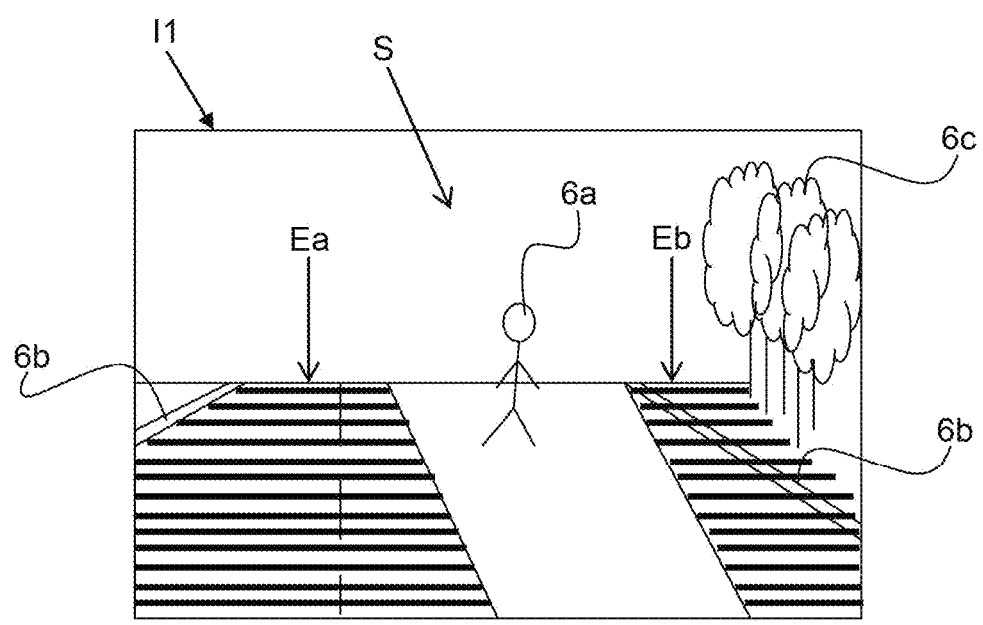
FIG. 3b is a schematic view of an image acquired by the camera of the driving-assisting system of FIGS. 1a and 1b, said image showing the detected free space of FIG. 3a, according to one non-limiting embodiment.

In the non-limiting example illustrated in FIGS. 3a and 3b, the sensor 10 has detected two free spaces Ea and Eb, namely a free space Ea to the left of the pedestrian 6a and a free space Eb to the right of the pedestrian 6a.

Said at least one camera 12 is described in detail below. The camera 12 is configured to acquire images I1 of the environment outside the vehicle 2 (function f3(12, I1) illustrated in FIG. 1b). In one non-limiting embodiment, the camera 12 is a high-definition camera, i.e. a so-called HD camera. In non-limiting examples, the camera 12 has a resolution of 4096×1080 pixels. In one non-limiting embodiment, the camera 12 is an infrared or near-infrared camera. This non-limiting embodiment allows images I1 of the environment outside the vehicle 2 to be acquired at night. In another non-limiting embodiment, the camera 12 allows images I1 to be acquired during the day. In the latter case, it thus works with visible light. The images I1 are also called primary images I1.

As illustrated in FIG. 1a, in one non-limiting embodiment, the camera 12 is placed in the passenger compartment 21 of the motor vehicle 2. In particular, in one non-limiting example it is incorporated behind the windshield near the central rear-view mirror 22. The images I1 of the environment outside the motor vehicle 2 may contain moving objects such as, in non-limiting examples, a pedestrian, a bicycle, another motor vehicle, etc. and stationary objects such as, in non-limiting examples, a lamppost, a tree, a building, the road markings of the road 4 on which the motor vehicle 2 is driving or the road markings of adjacent roads, etc. In the non-limiting example illustrated in FIG. 2b, an image I1 containing a pedestrian 6a, the road markings 6b of the road 4 on which the motor vehicle 2 is driving, and trees 6c, has been shown.

Thus, on the basis of the acquired images I1, the camera 12 is further configured to detect the presence of at least one object 6 in the environment outside the motor vehicle 2(function f4(12, 6) illustrated in FIG. 1b).

It will be noted that the combination of the sensor 10 and of the camera 12 allows the safety level referred to as ASIL D, ASIL being the acronym of Automotive Safety Integrity Level, as described in standard ISO 26262, to be obtained. It will be noted that the sensor 10 and the camera 12 are each classified ASIL B. The combination of two devices classified ASIL B allows a higher safety level to be obtained, here ASIL D. This in particular allows the safety margin with respect to hard braking to be increased, and thus the accident to be avoided if no free space E is found. Specifically, for example at night, if the camera 12 does not see the object 6 due to a lack of lighting or not accurately enough to classify it correctly, the sensor 10 is able to detect the object 6 in the dark and subsequently the light-emitting device 11 may illuminate the object 6, which allows the camera 12 to correctly detect and classify the object 6 just like the sensor 10 did. Thus, if the object 6 is classified as being a pedestrian for example, if the pedestrian is far enough away a warning may be generated, however, if he is nearby, braking may be activated, and if he is too close, the vehicle 2 may pull into an available free space E.

On the basis of said acquired images I1, the camera 12 is further configured to detect at least one free space E (function f5(12, E) illustrated in FIG. 1b). In the non-limiting example of FIG. 3b, the free spaces Ea and Eb are thus also detected by the camera 12.

Said electronic control unit 13 is described in detail below. In one non-limiting embodiment, said electronic control unit 13 is independent of the sensor 10 and of the camera 12. In another non-limiting embodiment, the electronic control unit 13 is integrated into the sensor 10 or into the camera 12. In one non-limiting embodiment, said electronic control unit 13 is configured to transmit a signal W3 (illustrated in FIG. 1a) to a human-machine interface 25 of said motor vehicle 2 (function f6(13, 25, W3) illustrated in FIG. 1b) and/or to modify the color of the light beam of one or more light-emitting modules 26 placed in the passenger compartment 21 of said vehicle 2 (function f15(13, 26, 21) illustrated in FIG. 1b). These functions f6 and f15 are executed following detection of an object 6, or to warn the driver of the change of path, or to warn the driver that he must change path, or to tell him to brake urgently.

Thus, in one non-limiting example, the signal W3 comprises a visual and/or an audio warning message in order to warn the driver of the motor vehicle 2 that there is an object 6 in front of or to the sides of the motor vehicle 2, namely an object 6 that is located on the current path T0 of the motor vehicle 2 or that is due to cross said current path T0, or in order to warn the driver that he must change path or that he must brake urgently. In one non-limiting example, the signal W3 is a visual display of the pedestrian 6a on a HUD screen, with for example a red color. The driver thus drives more vigilantly or is forewarned. In one non-limiting embodiment, the light-emitting modules 26 generate ambient lighting inside the motor vehicle 2. Their light beam may thus be modified so as to emit the color red to warn the driver of the motor vehicle 2 that there is an object 6 in front of or to the sides of the motor vehicle 2, or that he must change path or that he must brake urgently. The driver thus drives more vigilantly or is forewarned. It will be noted that if the light-emitting modules 26 are off, they may be turned on by the electronic control unit 13 so as to emit a light beam of red color in one non-limiting example.

Said electronic control unit 13 is further configured to compute a time to collision TTC between said motor vehicle 2 and the detected object 6 (function f14(13, TTC, 2, 6) illustrated in FIG. 1b). In a manner well known to those skilled in the art, the time to collision TTC is computed from the speed of the motor vehicle 2, the distance of the object 6 with respect to the motor vehicle 2 and the direction of the object 6.

It will be noted that the function f2 of detecting objects 6 with the sensor 10, and the function f5 of searching for a free space E with the camera 12, are performed continuously. In contrast, the decision to use the result of the detection of objects 6 and of a free space E is made by the electronic control unit 13 depending on the time to collision TTC computed by the electronic control unit 13. The result of functions f2 and f5 are used.

Figure 8:
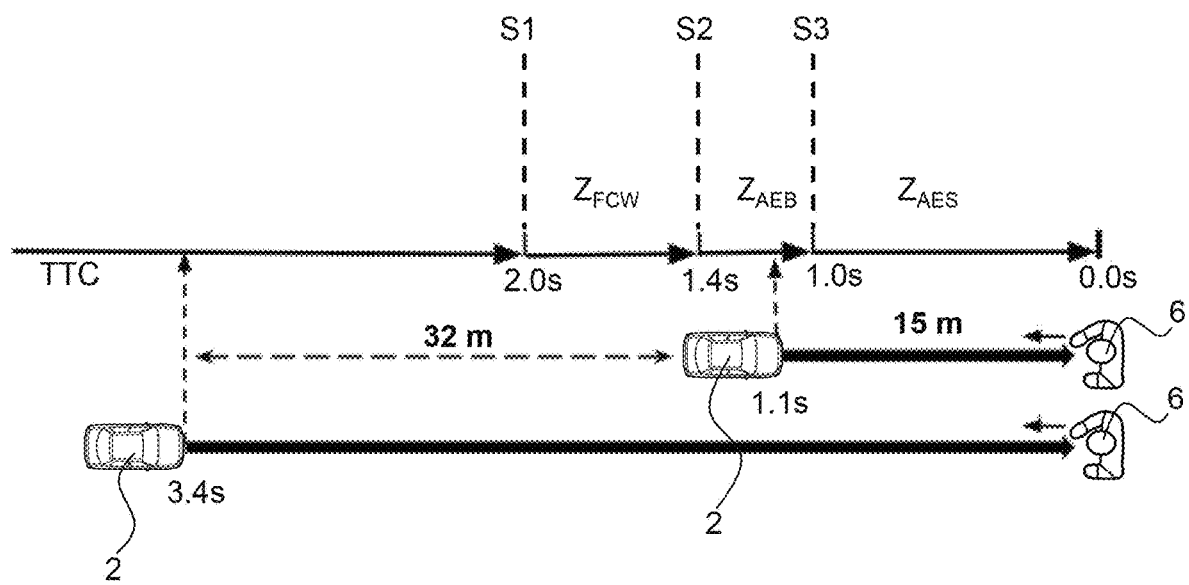
FIG. 8 illustrates a time line relating to a time to collision between a vehicle and a pedestrian, the time to collision being a condition of implementation of certain steps of the method for assisting with driving at night of FIG. 6 and of the method for assisting with driving during the day of FIG. 7, according to one non-limiting embodiment.

Specifically, following detection of an object 6, the following three cases such as illustrated in FIG. 8 may arise:
  the time to collision TIC is greater than a first threshold S1: the driver of the motor vehicle 2 may himself decide on the action to be taken to avoid a collision with the object 6. In one non-limiting embodiment, the first threshold S1 is equal to 2 seconds, the time to collision TTC is comprised between this first threshold S1 and a second threshold S2. The motor vehicle 2 is located in a first region ZFCW in which a warning is given to the driver so that he may decide what action to take to avoid the collision. In one non-limiting embodiment, the second threshold S2 is equal to 1.4 seconds, the time to collision TTC is comprised between this second threshold S2 and a third threshold S3. The motor vehicle 2 is located in a second region ZAEB in which the device AEB is triggered to automatically brake the motor vehicle 2 and to avoid the collision. In one non-limiting embodiment, the third threshold S3 is equal to 1 second.

In these three cases, it is not necessary to use the result of function f5, i.e. the search for the free space E that will be used when diverting the motor vehicle 2 from its current path T0 to avoid the collision with the object 6. In contrast, if the time to collision TTC is less than or equal to the third threshold S3, the motor vehicle 2 is in a third region ZAES in which it is useful to select a free space E with a view to redirecting the motor vehicle 2 toward a path T1, also called the new path T1, in order to avoid the collision with the object 6.

Thus, said electronic control unit 13 is furthermore configured to select (function f7(13, E) illustrated in FIG. 1*b*) a free space E found at least by the sensor 10 or the camera 12, and found at most by the sensor 10 and by the camera 12. It will be noted that it is possible for the camera not to find a free space E, in the event for example that it is defective, but for the sensor 10 to find one, and vice versa. If a single free space E is found, the electronic control unit selects said free space E. In one non-limiting embodiment, depending on the time to collision TTC, the electronic control unit 13 either executes function f7 or does not. Thus, if the time to collision TTC is less than or equal to the third threshold S3, function f7 is executed.

If a plurality of free spaces E are found, the electronic control unit 13 selects the free space E according to at least one determined criterion. In non-limiting examples, the determined criterion is:

a) the free space E is larger than the width of the motor vehicle 2 so that the latter may pull into this free space E, b) the free space E is on a road 4. The road 4 is a road on which the motor vehicle 2 is driving, or an adjacent road onto which the motor vehicle 2 may turn. The road may be an asphalt road, a paved road, a concrete road, etc.

c) the free space E is located inside the road markings of a road (whether it be the one on which the motor vehicle 2 is driving or an adjacent one), d) the free space E allows the motor vehicle 2 to maneuver safely. Thus, for example, if a free space E requires the motor vehicle 2 to turn too much (by 90° for example), this free space E is not chosen because the maneuver required to turn the motor vehicle 2 may be dangerous.

The free space E that meets the most determined criteria will be selected. In the non-limiting example illustrated in FIGS. 3*a* and 3*b*, the electronic control unit 13 has selected one of the free spaces, namely the free space Ea, which is located to the left of the motor vehicle 2, from among the two free spaces Ea and Eb. Specifically, the free space Ea meets the four determined criteria mentioned above whereas the free space Eb meets only the last criterion. Specifically, it is not wide enough for the motor vehicle 2 and is not completely on the road 4 on which the motor vehicle 2 is driving since it lies partly beyond the road markings 6*b* of said road 4.

Said at least one light-emitting device 11 is described in detail below. In one non-limiting embodiment, said at least one light-emitting device 11 is a headlamp of the motor vehicle 2. In one non-limiting variant of embodiment, the headlamp is a matrix headlamp. This allows just a chosen region to be illuminated, in order to clearly demarcate the one or more detected objects 6 or a selected free space E for example. It will be recalled that a so-called matrix light-emitting device 11 comprises a plurality of light-emitting modules (not shown) that form a so-called matrix beam. All of the light-emitting pixels of the various light-emitting modules then form a pixelated light beam, also called a matrix light beam. The light-emitting pixels are selectively activatable, i.e. they may be turned on independently of each other.

In one non-limiting embodiment, said at least one light-emitting device 11 is configured to illuminate the one or more objects 6 detected at least by the radar sensor 10 and at most by the sensor 10 and the camera 12 (function f8(11, 6) illustrated in FIG. 1*b*). Thus, the light-emitting device 11 illuminates the object 6 as soon as it is detected by the sensor 10. This allows the camera 12 to be helped to also detect the object, if the camera had been unable to do so beforehand, and otherwise the camera to be helped to classify said object 6, if the camera had been unable to do so beforehand.

Figure 2A:
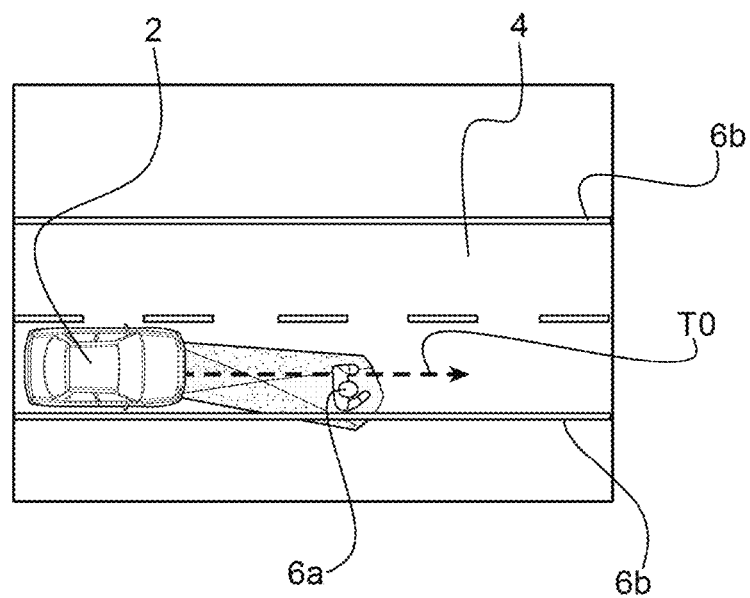
FIG. 2a is a schematic view from above of the vehicle of FIG. 1a and of an object detected and illuminated by the driving-assisting system of FIGS. 1a and 1b, according to one non-limiting embodiment.
Figure 2B:
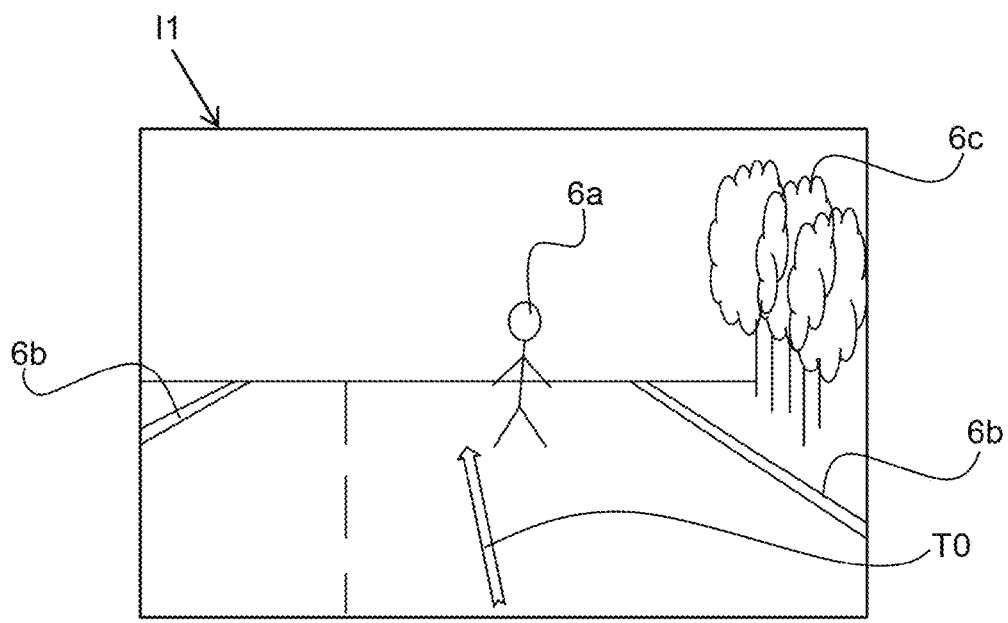
FIG. 2b is a schematic view of an image acquired by the camera of the driving-assisting system of FIGS. 1a and 1b, said image showing the detected object of FIG. 2a, according to one non-limiting embodiment.

In the non-limiting example illustrated in FIG. 2*a*, the light-emitting device 11 illuminates the pedestrian 6*a*, who is located on the current path T0 of the motor vehicle 2. If another pedestrian is located on the sidewalk and he is not heading onto the path T0 (he is not heading in the direction of the motor vehicle 2), he is not illuminated. In one non-limiting embodiment, the driving-assisting system 1 comprises two light-emitting devices 11 configured to illuminate the one or more detected objects 6. Thus, the headlamp 11 illuminates the one or more objects 6 that are located on the current path T0 of the motor vehicle 2 or that are heading in the direction of its current path T0.

In one non-limiting embodiment, said at least one light-emitting device 11 is further configured to illuminate said at least one free space E selected by said electronic control unit 13 (function f9(11, E) illustrated in FIG. 1*b*). In the non-limiting example illustrated in FIG. 3*a*, the light-emitting device 11 illuminates one of the two free spaces Ea and Eb. It illuminates the free space Ea located to the left of the selected pedestrian 6*a*. In one non-limiting embodiment, depending on the time to collision TTC, the light-emitting device 11 either executes function f9 or does not. Thus, if the time to collision TTC is less than or equal to the third threshold S3, function f9 is executed. In one non-limiting embodiment, the light-emitting device 11 illuminating the free space E also illuminates the detected object 6.

Following selection of a free space E, said electronic control unit 13 is further configured to activate display of images I2 in the selected free space E so as to indicate a new path T1 to be followed for said vehicle 13 (function f10(13, I2, E, T1) illustrated in FIG. 1*b*). The images I2 are also called secondary images I2. This path T1 is a new path, different from the current path T0 of the motor vehicle 2. This thus makes it possible to indicate to the motor vehicle 2 the new path T1 that it must follow, which is different from its current path T0 in the case where a valid free space E is found, i.e. has been selected. In one non-limiting embodiment, depending on the time to collision TTC, the electronic control unit 13 either executes function f10 or does not. Thus, if the time to collision TTC is less than or equal to the third threshold S3, function f10 is executed.

Figure 4A:
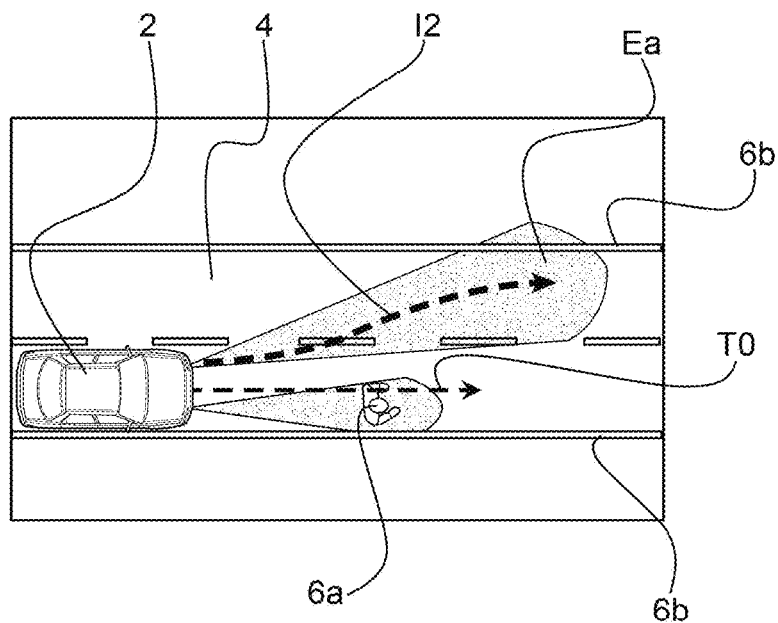
FIG. 4a is a schematic view from above of the vehicle of FIG. 1a and of a free space selected and illuminated by the driving-assisting system of FIGS. 1a and 1b, and of a luminous image projected onto the road on which said vehicle is driving, in said selected free space, according to a first non-limiting embodiment.
Figure 4B:
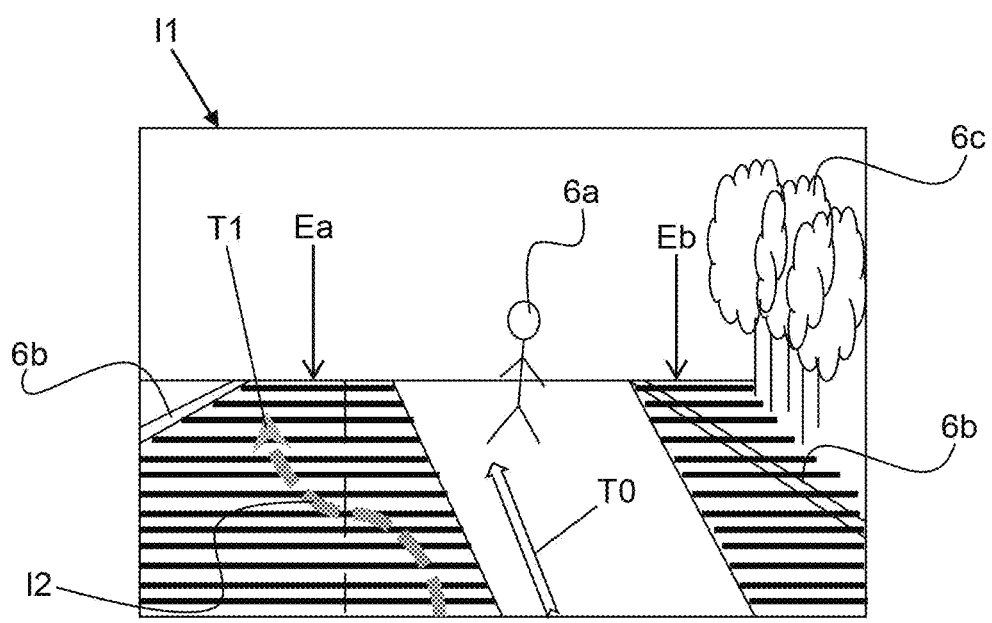
FIG. 4b is a schematic view of an image acquired by the camera of the driving-assisting system of FIGS. 1a and 1b, and of said luminous image of FIG. 4a projected into said selected free space, according to one non-limiting embodiment.

In a first non-limiting embodiment illustrated in FIGS. 4a and 4b, the images I2 are luminous images projected onto the road 4 comprising said selected free space E. Here, the road 4 is the one on which the motor vehicle 2 is driving. It will be noted that this road could be an adjacent road, which adjacent road would therefore comprise a free space E into which the motor vehicle 2 could pull. The luminous images I2 are projected by said at least light-emitting device 11. In one non-limiting embodiment, they are projected by the same light-emitting device 11 as that used to illuminate the detected object 6. Thus, the electronic control unit 13 will activate display of the images I2 by activating the light-emitting device 11 to this end. The light-emitting device 11 is thus further configured to project, onto a road 4, here the road on which said motor vehicle 2 is driving, luminous images I2 in the selected free space E, so as to indicate a path T1 to be followed for said motor vehicle 2 (function f11(11, 4, I2, E, T1) illustrated in FIG. 1b). The light-emitting device 11 is thus activated, to project said images I2. In the non-limiting example illustrated in FIGS. 4a and 4b, the new path T1 is located on the left of the motor vehicle 2.

In one non-limiting embodiment, the luminous images I2 projected onto said road 4 to indicate the path T1 to be followed for the vehicle 2 represent an arrow corresponding to said path T1 to be followed. Thus, in the non-limiting example illustrated in FIGS. 4a and 4b, a dashed arrow has been shown indicating the new path T1 that the motor vehicle 2 must follow. It will be noted that FIG. 4b is identical to FIG. 3b except that both the projection of the luminous images I2 indicating the new path T1 to be followed, and the current path T0 of the motor vehicle 2 have been shown, the latter for illustration. Thus, in the non-limiting example illustrated, the images I2, here the arrow indicating the path T1, may be seen by the driver in said selected free space Ea.

Figure 5:
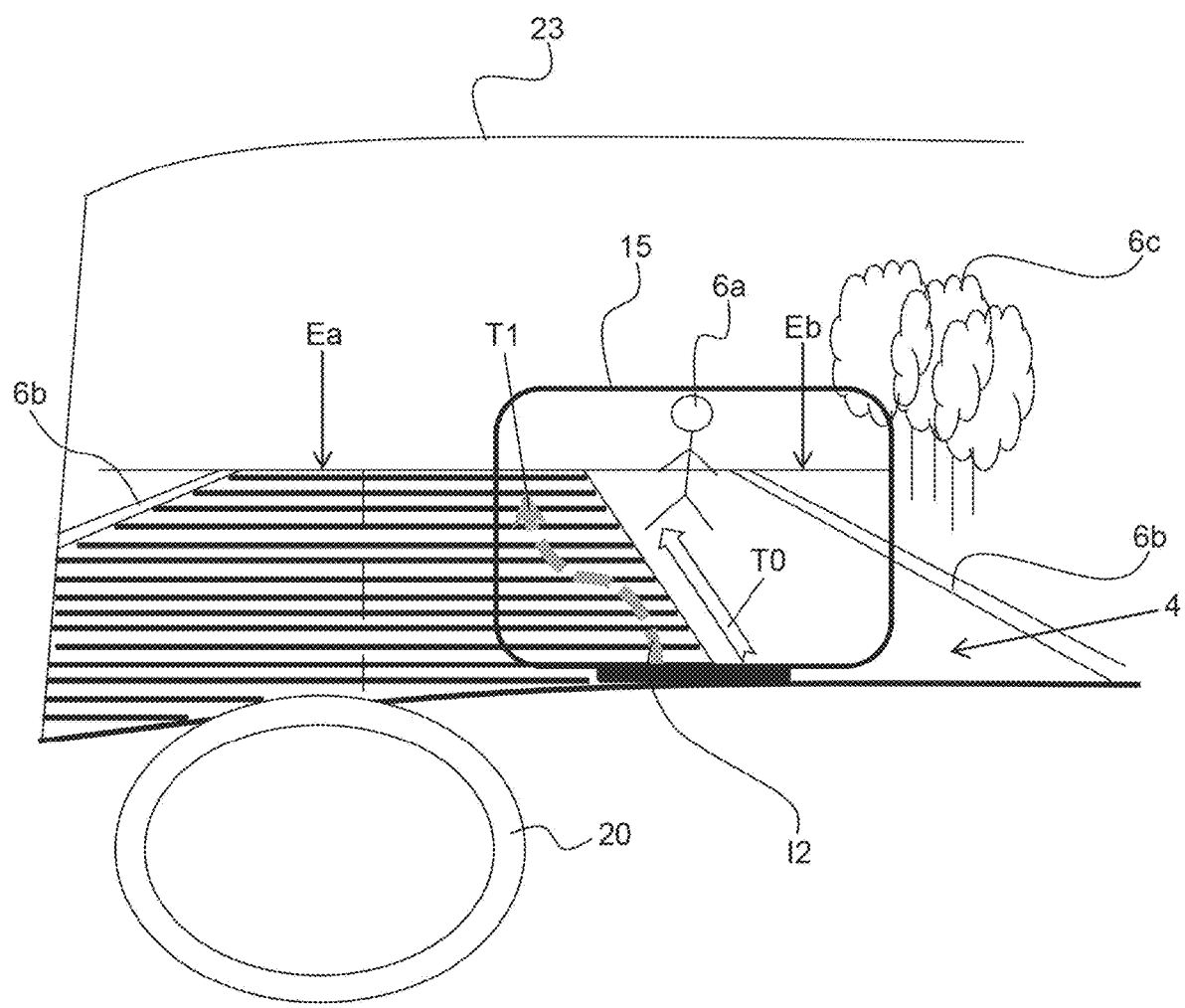
FIG. 5 is a schematic view from above of the vehicle of FIG. 1a and of a free space selected by the driving-assisting system of FIGS. 1a and 1b, and of an image displayed on a human-machine interface, in said selected free space, according to a second non-limiting embodiment.

In a second non-limiting embodiment, the images I2 are images displayed on a human-machine interface 25. Thus, the electronic control unit 13 will activate display of the images I2 by activating the human-machine interface 25 to this end. The human-machine interface 25 is thus activated, to display the images I2. In non-limiting examples, the human-machine interface 25 is a dashboard screen, a center-console screen, a screen for a head-up display (HUD), etc. As illustrated in FIG. 5, in one non-limiting example, the human-machine interface 25 is a HUD screen. In FIG. 5, the steering wheel 20 of the motor vehicle 2, and the windshield 23, through which the driver can see the road 4 and the environment outside the motor vehicle 2, have been shown. In particular, he sees the pedestrian 6a, the road markings 6b of the road 4, and the trees 6c. In FIG. 5, the selected free space Ea has been shown hatched with horizontal lines for illustration.

In one non-limiting embodiment, the images I2 displayed on the human-machine interface 25 to indicate the new path T1 to be followed for the motor vehicle 2 represent an arrow corresponding to said path T1 to be followed. Thus, in the non-limiting example illustrated in FIG. 5, a dashed arrow has been shown on the HUD screen indicating the new path T1 that the motor vehicle 2 must follow. Thus, on his HUD screen, the driver will see the new path T1 to be followed by the motor vehicle 2 by virtue of the displayed arrow I2. In one non-limiting embodiment, the current path T0 may also be displayed on the human-machine interface 25, as illustrated. Thus, in the non-limiting example illustrated, the images I2, here the arrow indicating the new path T1, are superposed, through the HUD screen, on the free space Ea seen through the windshield 23. Thus, the arrow may be seen by the driver in said selected free space Ea.

Thus, in the case of a non-autonomous motor vehicle 2, the indicated path T1 allows the driver of the motor vehicle 2 to know in which direction he must move the motor vehicle 2 to reach the selected free space E.

Thus, in the case of a semi-autonomous motor vehicle 2, the indicated path T1 allows the driver of the motor vehicle 2 to know in which direction he must turn the steering wheel 20 of the motor vehicle 2 to reach the selected free space E. Thus, in the case of a semi-autonomous motor vehicle 2, it is the driver who must initiate an action A on the steering wheel 20, here the action of turning the steering wheel 20 to the left or to the right, which allows a movement of the motor vehicle 2 toward the selected free space E to be initiated, before the device AES takes charge and continues the movement of the motor vehicle 2 toward the selected free space E depending on the new path T1. Thus, in this case, the device AES is configured to take charge of a movement of the motor vehicle 2 in the direction of said selected free space E, which movement is initiated by an action A of a driver of said motor vehicle 2 on his steering wheel 20 (function f11(AES, E, A, 20) illustrated in FIG. 1b).

Thus, in the case of an autonomous motor vehicle 2, the indicated path T1 allows the driver (even if he does not take any action in this case) to know in which direction the motor vehicle 2 is going to go. The device AES follows the new path T1 and thus directs the motor vehicle 2 toward the selected free space E depending on this new path T1. Thus, in this case, the device AES is configured to move said motor vehicle 2 in the direction of said selected free space E (function f12(AES, E) illustrated in FIG. 1).

Figure 6:
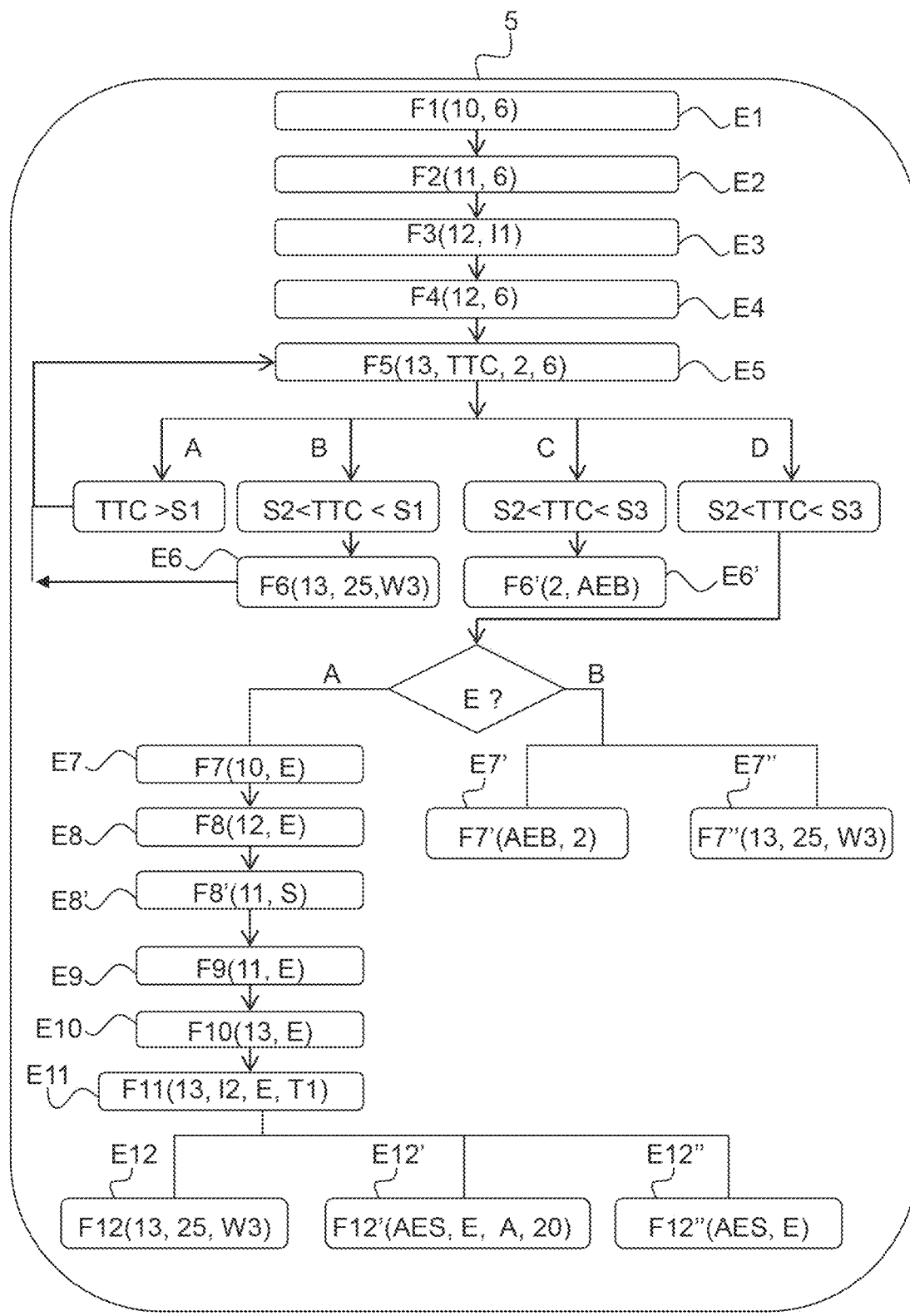
FIG. 6 is a flowchart of a method for assisting with driving a vehicle at night, said method for assisting with driving at night being implemented by said driving-assisting system of FIGS. 1a and 1b, according to one non-limiting embodiment.

Thus, the described driving-assisting system 1 makes it possible to implement a method 5 for assisting with driving at night, such as illustrated in FIG. 6, according to one non-limiting embodiment. According to this illustrated non-limiting embodiment, a single object 6 is detected. According to this illustrated non-limiting embodiment, said at least one light-emitting device 11 is a headlamp. According to this non-limiting embodiment, to begin with both headlamps 11 illuminate a detected object 6. According to this illustrated non-limiting embodiment, the images I2 are images projected onto the ground on the road 4 on which the motor vehicle 2 is driving. According to this non-limiting embodiment, the time to collision TTC is taken into account when searching for and selecting a free space E.

Figure 7:
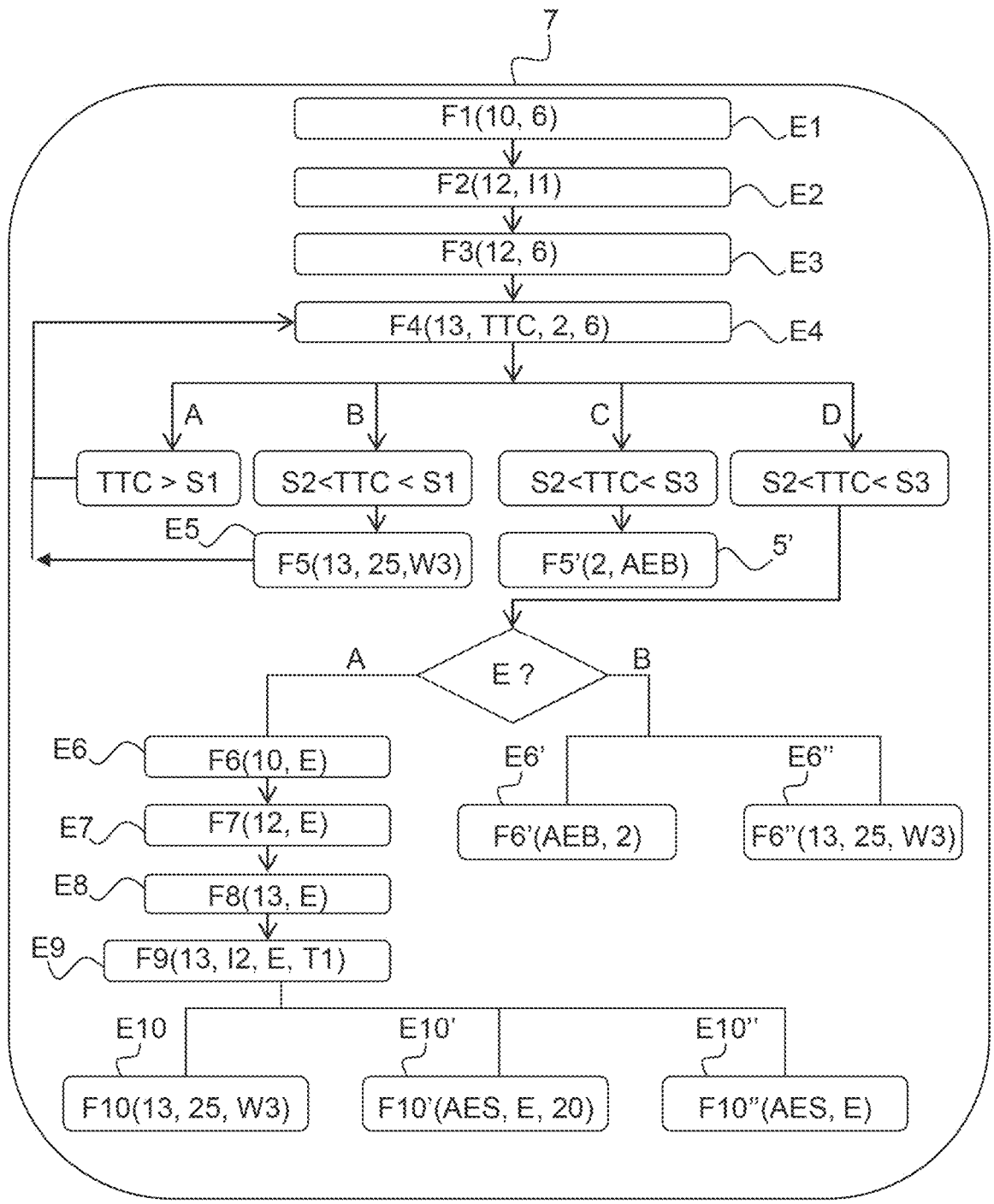
FIG. 7 is a flowchart of a method for assisting with driving a vehicle during the day, said method for assisting with driving during the day being implemented by said driving-assisting system of FIGS. 1a and 1b, according to one non-limiting embodiment.

Moreover, the described driving-assisting system 1 makes it possible to implement a method 7 for assisting with driving during the day, such as illustrated in FIG. 7, according to one non-limiting embodiment. According to this illustrated non-limiting embodiment, a single object 6 is detected. According to this illustrated non-limiting embodiment, said at least one light-emitting device 11 is a headlamp. According to this non-limiting embodiment, neither of the two headlamps 11 illuminates a detected object 6. According to this illustrated non-limiting embodiment, the images I2 are images displayed on a HUD screen. According to this non-limiting embodiment, the time to collision TTC is taken into account when searching for and selecting a free space E.

The method 5 for assisting with driving at night is now described below. It comprises the following steps, such as illustrated in FIG. 6. It will be noted that certain steps are carried out in parallel.

In a step E1), additionally labelled F1(10, 6), the sensor 10 detects the presence of an object 6 in the environment outside the motor vehicle 2. The sensor 10 thus detects the object 6 and classifies it. In the non-limiting example illustrated, it detects a pedestrian 6a who is on its current path T0. If no object 6 is detected, the motor vehicle 2 continues to drive along its current path T0. It will be noted that the detection step is carried out continuously.

In a step E2), additionally labelled F2(11, 6), the two headlamps 11 illuminate the detected object 6. They thus illuminate the pedestrian 6a. This allows the driver to clearly see the pedestrian 6a in front of him, especially at night. This will also help the camera 12 to detect objects 6 and classify them. It will be noted that the two headlamps 11 are activated so as to illuminate the object 6 thus detected. In one non-limiting embodiment they are activated by the electronic control unit 13.

In a step E3), additionally labelled F3(12, I1), the camera 12 acquires images I1 of the environment outside the motor vehicle 2. In the non-limiting example illustrated in FIG. 2b, the acquired images I1 are images of the pedestrian 6a, but also of the road markings 6b of the road 4, and of the trees 6c bordering the road 4. It will be noted that the acquisition step is carried out continuously. Therefore, at the same time as step E1, E2 and the following steps.

In a step E4), additionally labelled F4(12, 6), the camera 12 detects the presence of said object 6 in the environment outside the vehicle 2. The camera 12 thus detects the object 6 and classifies it. Thus, in the non-limiting example illustrated, on the basis of its images I1 it also detects the pedestrian 6a. It will be noted that the camera 12 may detect certain objects 6 at night without lighting. For example at night it may detect the rear lights of a vehicle located in front of the vehicle in question and thus identify this vehicle as being a vehicle. It will be noted that this step begins before the object 6 is illuminated by the headlamps 11 and continues after this illumination. Thus, detection and classification of the presence of the pedestrian 6a is facilitated by the fact that he is illuminated by the two headlamps 11, in particular at night. It will be noted that the detection step is carried out continuously.

In a step E5), additionally labelled F5(13, TTC, 2, 6), the electronic control unit 13 computes the time to collision TTC between the motor vehicle 2 and the detected object 6. If the time to collision TTC is greater than a first threshold S1 (branch A), step E5 is returned to. If the time to collision TTC is comprised between the first threshold S1 and the second threshold S2 (branch B), in a step E6), additionally labelled F6 (13, 25, W3), the electronic control unit 13 activates a warning signal W3 on a human-machine interface 25 to notify the driver that he must pay attention to the pedestrian 6a and step E5 is returned to. The electronic control unit may also modify the color of the light beam of one or more light-emitting modules 26 placed in the passenger compartment 21 of said motor vehicle 2 as described above. If the time to collision TTC is comprised between the second threshold S2 and the third threshold S3 (branch C), in a step E6'), additionally labelled F6'(2, AEB), the device AEB is activated to brake the motor vehicle 2 and step E5 is returned to. If the time to collision TTC is less than or equal to a third threshold S3 (branch D), then the following steps are executed.

If there is at least one free space E around the motor vehicle 2 then (branch A), in a step E7), additionally labelled F7(10, E), the sensor 10 detects at least one free space E around said motor vehicle 2, namely a free space E in the environment outside the motor vehicle 2. In the non-limiting example illustrated in FIG. 3b, the sensor detects two free spaces Ea and Eb in front of the motor vehicle 2, namely one Ea to the left and one Eb directly to the right and off the road 4, which here is the road on which the motor vehicle 2 is driving.

In a step E8), additionally labelled F8(12, E), the camera 12 detects said at least one free space E on the basis of said acquired images I1. In the non-limiting example, the camera 12 also detects the two free spaces Ea and Eb in front of the motor vehicle 2. In order to help the camera 12 better detect a free space E, in one non-limiting embodiment, in a step E8'), additionally labelled F8'(11, S), the headlamps 11 illuminate the outside environment in which the pedestrian 6a is found, i.e. the scene S (illustrated in FIG. 3b) in which he is located, without causing discomfort glare to the surrounding vehicles, cyclists or pedestrians if possible. It will be noted that the intensity of the illumination is different from that used to illuminate just the pedestrian 6a.

In a step E9), additionally labelled F9(11, E), at least one of the headlamps 11 illuminates said at least one free space E found. It may or may not continue to illuminate the pedestrian 6a. In the non-limiting example illustrated in FIG. 3a, the headlamp illuminates the free spaces Ea and Eb but thus no longer illuminates the pedestrian 6a. This thus allows the driver to see, at night, the free spaces E found, and to learn whether there is an alternative to the current path T0 directing him toward the pedestrian 6a, i.e. a new path T1 that allows him to avoid the pedestrian 6a and therefore the accident. It will be noted that if there are two free spaces Ea, Eb, a single headlamp 11 may illuminate the two free spaces Ea, Eb, such as in the case, in one non-limiting example, of a headlamp 11 comprising a matrix module of 4000 pixels.

In a step E10), additionally labelled F10(13, E), the electronic control unit 13 selects a free space E found by said sensor 10 and/or said camera 12. In the non-limiting example, the electronic control unit 13 determines which free space E among the two free spaces Ea and Eb found is the most appropriate, i.e. the space toward which the motor vehicle 2 must turn. Thus, it selects the free space Ea since the other free space Eb is off the road 4 and is not wide enough for the motor vehicle 2 to pull into as described above.

In a step E11), additionally labelled F11(13, I2, E, T1), the electronic control unit 13 activates display of images I2 in the selected free space E so as to indicate a new path T1 for said motor vehicle 2. In the non-limiting embodiment described, the headlamp illuminating the selected free space Ea is activated by the electronic control unit 13. Thus, it projects onto the road 4, here the road on which said motor vehicle 2 is driving, luminous images I2 in the selected free space Ea so as to indicate the new path T1 to be followed for said vehicle 2. In the non-limiting example illustrated in FIG. 4a, a dashed arrow is projected onto the ground. This allows the driver to clearly identify the new path T1.

If the motor vehicle 2 is a non-autonomous vehicle, in a step E12, additionally labelled F12(13, 25, W3), the electronic control unit 13 transmits a signal W3 to a human-machine interface 25 of said motor vehicle 2 to warn the driver that he must change course.

If the motor vehicle 2 is a semi-autonomous vehicle, in a step E12', additionally labelled F12'(AES, E, A, 20), the device AES takes charge of a movement of the motor vehicle 2 in the direction of said selected free space E, which movement is initiated by an action A of a driver on said motor vehicle 2 on his steering wheel 20. Provision may also be made in parallel for the electronic control unit 13 to transmit a signal W3 to a human-machine interface 25 of said motor vehicle 2 to warn the driver that he must change path and initiate the movement via the steering wheel 20.

If the motor vehicle 2 is an autonomous vehicle, in a step E12", additionally labelled F12"(AES, E), the device AES makes the motor vehicle 2 move in the direction of said selected free space E along the path T1, without driver intervention. Provision may also be made in parallel for the electronic control unit 13 to transmit a signal W3 to a human-machine interface 25 of said motor vehicle 2 to warn the driver of the change in path.

It will be noted that if there is no free space E around the motor vehicle 2 (the sensor 10 detects no free space E, then (branch B), in the case of an autonomous or semi-autonomous motor vehicle 2, in a step E7', additionally labelled F7'(AEB, 2), the device AEB brakes the motor vehicle 2 automatically without driver intervention. In the case of a non-autonomous motor vehicle 2, in a step E7", additionally labelled F7"(13, 25, W3), the electronic control unit 13 transmits a signal W3 to a human-machine interface 25 of said motor vehicle 2 to warn the driver that he must brake urgently.

Thus, the method 5 for assisting with driving at night allows the pedestrian 6a to be avoided, in particular when a free space E is found and selected. It thus allows an accident to be avoided. It will be noted that the outcome is the same if the detected object 6 is a tree (or any other fixed object) located in the field of view of the sensor 10 and on the path T0 of the motor vehicle 2.

The method 7 for assisting with driving during the day is now described below. It comprises the following steps, such as illustrated in FIG. 7. It will be noted that certain steps are carried out in parallel.

In a step E1), additionally labelled F1(10, 6), the sensor 10 detects the presence of an object 6 in the environment outside the motor vehicle 2. The sensor 10 thus detects the object 6 and classifies it. In the non-limiting example illustrated, it detects a pedestrian 6a who is on its current path T0. If no object 6 is detected, the motor vehicle 2 continues to drive along its current path T0. It will be noted that the detection step is carried out continuously.

In a step E2), additionally labelled F2(12, I1), the camera 12 acquires images I1 of the environment outside the motor vehicle 2. In the non-limiting example illustrated in FIG. 2b, the acquired images I1 are images of the pedestrian 6a, but also of the road markings 6b of the road 4, and of the trees 6c bordering the road 4. It will be noted that the acquisition step is carried out continuously. Therefore, at the same time as step E1 and the following steps.

In a step E3), additionally labelled F3(12, 6), the camera 12 detects the presence of said object 6 in the environment outside the vehicle 2. The camera 12 thus detects the object 6 and classifies it. Thus, in the non-limiting example illustrated, on the basis of its images I1 it also detects the pedestrian 6a. It will be noted that the detection step is carried out continuously.

In a step E4), additionally labelled F4(13, TTC, 2, 6), the electronic control unit 13 computes the time to collision TTC between the motor vehicle 2 and the detected object 6. If the time to collision TTC is greater than a first threshold S1 (branch A), step E4 is returned to. If the time to collision TTC is comprised between the first threshold S1 and the second threshold S2 (branch B), in a step E5), additionally labelled F5(13, 25, W3), the electronic control unit 13 activates a warning signal W3 on a human-machine interface 25 to notify the driver that he must pay attention to the pedestrian 6a and step E4 is returned to. The warning message W3 may indicate the pedestrian 6a on a HUD screen. In another non-limiting embodiment, the electronic control unit may also modify the color of a region of the light beam of one or more light-emitting modules 26 placed in the passenger compartment 21 (on the doors or on the dashboard) of said motor vehicle 2 to provide notification of the danger, the region on the side on which the pedestrian 6a is located in this non-limiting example. In another non-limiting embodiment, the electronic control unit 13 may cause the feet of the pedestrian 6a to be illuminated with a different color. If the time to collision TTC is comprised between the second threshold S2 and the third threshold S3 (branch C), in a step E5'), additionally labelled F5'(2, AEB), the device AEB is activated to brake the motor vehicle 2 and step E4 is returned to. If the time to collision TTC is greater than or equal to a third threshold S3 (branch D), then the following steps are executed.

If there is at least one free space E around the motor vehicle 2 then (branch A), in a step E6), additionally labelled F6(10, E), the sensor 10 detects at least one free space E around said motor vehicle 2, namely a free space E in the environment outside the motor vehicle 2. In the non-limiting example illustrated in FIG. 3b, the sensor detects two free spaces Ea and Eb in front of the motor vehicle 2, namely one Ea to the left and one Eb directly to the right and off the road 4, which here is the road on which the motor vehicle 2 is driving.

In a step E7), additionally labelled F7(12, E), the camera 12 detects said at least one free space E on the basis of said acquired images I1. In the non-limiting example, the camera 12 also detects the two free spaces Ea and Eb in front of the motor vehicle 2.

In a step E8), additionally labelled F8(13, E), the electronic control unit 13 selects a free space E found by the sensor 10 and/or said camera 12. In the non-limiting example, the electronic control unit 13 determines which free space E among the two free spaces Ea and Eb found is the most appropriate, i.e. the space toward which the motor vehicle 2 must turn. Thus, it selects the free space Ea since the other free space Eb is off the road 4 and is not wide enough for the motor vehicle 2 to pull into as described above.

In a step E9), additionally labelled F9(13, I2, E, T1), the electronic control unit 13 activates display of images I2 in the selected free space E so as to indicate a new path T1 for said motor vehicle 2. In the non-limiting embodiment described, it activates display of images I2 on the HUD screen to indicate a path T1 to be followed for said motor vehicle 2. In the non-limiting example illustrated in FIG. 4b, a dashed arrow is displayed on the HUD screen. This allows the driver to clearly identify the new path T1. Through the HUD screen, the driver may see the arrow indicating the path T1 to be followed, the arrow being located in the free space Ea (seen through the windshield 23) selected in the non-limiting example in question.

If the motor vehicle 2 is a non-autonomous vehicle, in a step E10, additionally labelled F10(13, 25, W3), the electronic control unit 13 transmits a signal W3 to a human-machine interface 25 of said motor vehicle 2 to warn the driver that he must change course.

If the motor vehicle 2 is a semi-autonomous vehicle, in a step E10', additionally labelled F10'(AES, E, A, 20), the device AES takes charge of a movement of the motor vehicle 2 in the direction of said selected free space E, which movement is initiated by an action A of a driver on said motor vehicle 2 on his steering wheel 20. Provision may also be made in parallel for the electronic control unit 13 to transmit a signal W3 to a human-machine interface 25 of said motor vehicle 2 to warn the driver that he must change path and initiate the movement via the steering wheel 20.

If the motor vehicle 2 is an autonomous vehicle, in a step E10", additionally labelled F10"(AES, E), the device AES makes the motor vehicle 2 move in the direction of said selected free space E along the path T1, without driver intervention. Provision may also be made in parallel for the electronic control unit 13 to transmit a signal W3 to a human-machine interface 25 of said motor vehicle 2 to warn the driver of the change in path.

It will be noted that if there is no free space E around the motor vehicle 2 (the sensor 10 detects no free space E, then (branch B), in the case of an autonomous or semi-autonomous motor vehicle 2, in a step E6', additionally labelled F6'(AEB, 2), the device AEB brakes the motor vehicle 2 automatically without driver intervention. In the case of a non-autonomous motor vehicle 2, in a step E6", additionally labelled F6"(13, 25, W3), the electronic control unit 13 transmits a signal W3 to a human-machine interface 25 of said motor vehicle 2 to warn the driver that he must brake urgently.

It will be noted that, in one non-limiting embodiment (not illustrated), the method 7 for assisting with driving during the day may further comprise illumination of said at least one detected object 6 by a headlamp 11, and illumination of said at least one detected free space E by a headlamp 11, as in the case of the method 5 for assisting with driving at night.

Of course the description of the invention is not limited to the embodiments described above and to the field described above. Thus, in another non-limiting embodiment, said at least one light-emitting device 11 is a rear light of the vehicle 2. In this case, the camera 12 is placed at the rear of the vehicle 2 and is configured to acquire images I1 of the outside environment behind and to the sides of the vehicle 2. This non-limiting embodiment is advantageous when the vehicle 2 is reversing for example. It will be noted that detection of an object 6 in front and to the sides, and detection of an object 6 behind and to the sides, may be combined. In this case, there will be a camera 12 and a sensor 10 at the front, and a camera 12 and a sensor 10 at the rear of the vehicle 2. Thus, in another non-limiting embodiment, the driving-assisting system 1 comprises a plurality of sensors 10 and a plurality of cameras 12. Thus, in another non-limiting embodiment, the luminous images I2 are projected by a light-emitting device 11 different from the one illuminating the detected object 6. Thus, in another non-limiting embodiment, the luminous images I2 projected onto said road 4 to indicate the new path T1 to be followed for the vehicle 2 represent a plurality of lines corresponding to said path T1 to be followed. Thus, in another non-limiting embodiment, if the sensor 10 is ASIL D or if safety regulations are less strict, the electronic control unit 13 may implement functions f6 and f15 solely on the basis of detection of the object 6 by the sensor 10. Similarly, in another non-limiting embodiment, if the camera 12 is defective, the electronic control unit 13 may implement function f7 solely on the basis of detection of the free space E by the sensor 10. Similarly, in another non-limiting embodiment, if the camera 12 is defective, the light-emitting device 11 may implement function f8 solely on the basis of detection of the object 6 by the sensor 10. Thus, in another non-limiting embodiment, if safety regulations are less strict, the electronic control unit 13 may implement functions f6 and f15 solely on the basis of detection of the object 6 by the camera 12. Similarly, in another non-limiting embodiment, if the sensor 10 is defective, the electronic control unit 13 may implement function f7 solely on the basis of detection of the free space E by the camera 12. Similarly, in another non-limiting embodiment, if the sensor 10 is defective, the light-emitting device 11 may implement function f8 solely on the basis of detection of the object 6 by the camera 12.

Thus, the described invention in particular has the following advantages:
- it makes it possible to avoid a collision with an object 6 that is an obstacle, in the event that the speed of the vehicle 2 is too high for it to be able to be braked in time;
- it makes it possible to illuminate the free space E found, with a view to guiding the driver toward the correct path T1;
- it makes it possible to effectively assist with driving, both during the day and at night;
- it is applicable to any type of vehicle 2, whether it is autonomous, semi-autonomous or non-autonomous.

What is claimed is:

1. A system for assisting with driving a vehicle, comprising:
    at least one sensor configured to detect the presence of an object in an environment outside the vehicle,
    at least one camera configured to acquire images of the environment outside the vehicle and to detect the presence of the object in the environment outside the vehicle,
    wherein the at least one sensor is further configured to detect at least one free space in the environment outside the vehicle,
    the at least one camera is further configured, on the basis of the acquired images, to detect at least one free space,
        an electronic control unit configured to select a free space found by the at least one sensor and/or the at least one camera,
        the electronic control unit is further configured to activate display of images in the selected free space so as to indicate a new path to be followed for the vehicle, and
        the electronic control unit is configured to compute a time to collision with the detected object, with the at least one sensor and the at least one camera being configured to detect at least one free space in the environment outside the vehicle if the time to collision is less than a threshold, and the electronic control unit is configured to activate display of images in the selected free space so as to indicate a new path to be followed for the vehicle if the time to collision is less than the threshold.

2. The driving-assisting system as claimed in claim 1, further comprising:
    at least one light-emitting device configured to illuminate the detected object,
    at least one light-emitting device configured to illuminate the at least one selected free space.

3. The driving-assisting system as claimed in claim 2, wherein the at least one light-emitting device is further configured to illuminate the scene in which the detected object is located.

4. The driving-assisting system as claimed in claim 2, wherein the at least one light-emitting device is a headlamp.

5. The driving-assisting system as claimed in claim 1, wherein the electronic control unit is configured to select a free space found by the sensor and by the camera.

6. The driving-assisting system as claimed in claim 1, wherein the images are luminous images projected onto a road including the selected free space.

7. The driving-assisting system as claimed in claim 1, wherein the images are images displayed on a human-machine interface.

8. The driving-assisting system as claimed in claim 1, wherein the vehicle is an autonomous vehicle.

9. The driving-assisting system as claimed in claim 1, further comprising an autonomous emergency steering device (AES) for steering the vehicle in an emergency, the AES being configured to move the vehicle toward the selected free space.

10. The driving-assisting system as claimed in claim 1, wherein the vehicle is a semi-autonomous vehicle.

11. The driving-assisting system as claimed in claim 1, further comprising an autonomous emergency steering device (AES) for steering the vehicle in an emergency, the AES being configured to take charge of a movement of the vehicle in the direction of the selected free space, the movement being initiated by an action of a driver on the steering wheel of the vehicle.

12. The driving-assisting system as claimed in claim 1, wherein the vehicle is a non-autonomous vehicle.

13. The driving-assisting system as claimed in claim 1, wherein the electronic control unit is configured to transmit a signal to a human-machine interface of the vehicle and/or to modify the color of a light beam of at least one light-emitting module placed in the passenger compartment of the vehicle.

14. A method for assisting with driving a vehicle at night, comprising:
 detecting, by at least one sensor, a presence of an object in an environment outside the vehicle,
 illuminating, by at least one light-emitting device, the detected object,
 acquiring, by at least one camera, images of the environment outside the vehicle,
 detecting, by the at least one camera, the presence of the object in the environment outside the vehicle,
 detecting, by the at least one sensor, at least one free space around the vehicle,
 detecting, by the at least one camera, the at least one free space in the images,
 illuminating, by at least one light-emitting device, the at least one free space found,
 selecting, by an electronic control unit, the at least one free space found by the at least one sensor and/or by the at least one camera,
 activating, by the electronic control unit, display of images in the selected free space so as to indicate a new path for the vehicle,
 computing, by the electronic control unit, a time to collision with the detected object, with the at least one sensor and the at least one camera being configured to detect at least one free space in the environment outside the vehicle if the time to collision is less than a threshold, and
 activating, by the electronic control unit, display of images in the selected free space so as to indicate a new path to be followed for the vehicle if the time to collision is less than the threshold.

15. The method for assisting with driving at night as claimed in claim 14, further comprising illuminating, by the at least one light-emitting device, a scene in which the detected object is located.

16. A method for assisting with driving a vehicle during the day, comprising:
 detecting, by at least one sensor, an object in an environment outside the vehicle,
 acquiring, by at least one camera, images of the environment outside the vehicle,
 detecting, by the at least one camera, the object in the environment outside the vehicle,
 detecting, by the at least one sensor, at least one free space around the vehicle,
 detecting, by the at least one camera, the at least one free space in the images,
 selecting, by an electronic control unit, the at least one free space found by the at least one sensor and/or by the at least one camera,
 activating, by the electronic control unit, display of images in the selected free space so as to indicate a new path for the vehicle,
 computing, by the electronic control unit, a time to collision with the detected object, with the at least one sensor and the at least one camera being configured to detect at least one free space in the environment outside the vehicle if the time to collision is less than a threshold, and
 activating, by the electronic control unit, display of images in the selected free space so as to indicate a new path to be followed for the vehicle if the time to collision is less than the threshold.

\* \* \* \* \*